F. X. MALOCSAY.
CIGAR BANDING MACHINE.
APPLICATION FILED MAY 11, 1916.

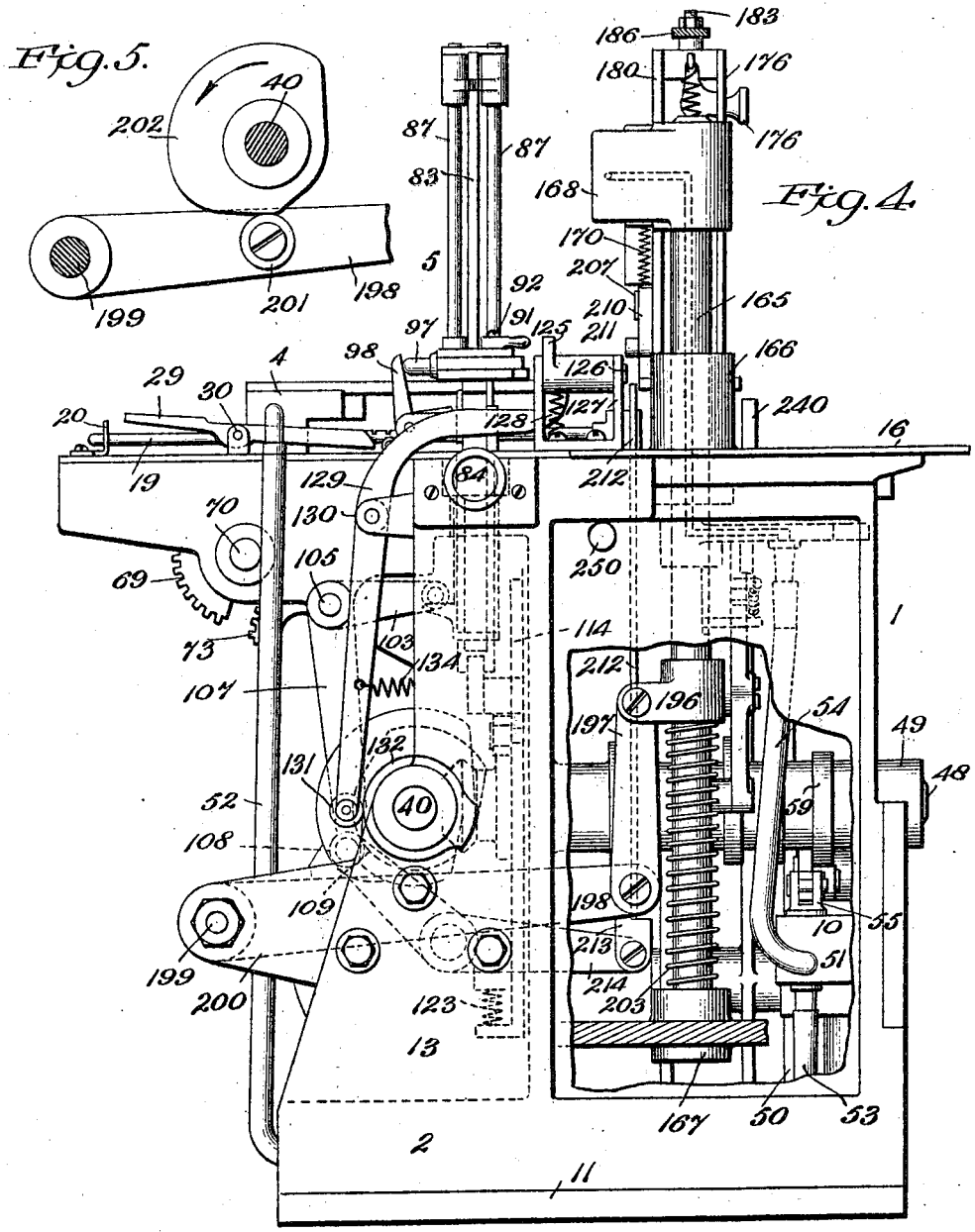

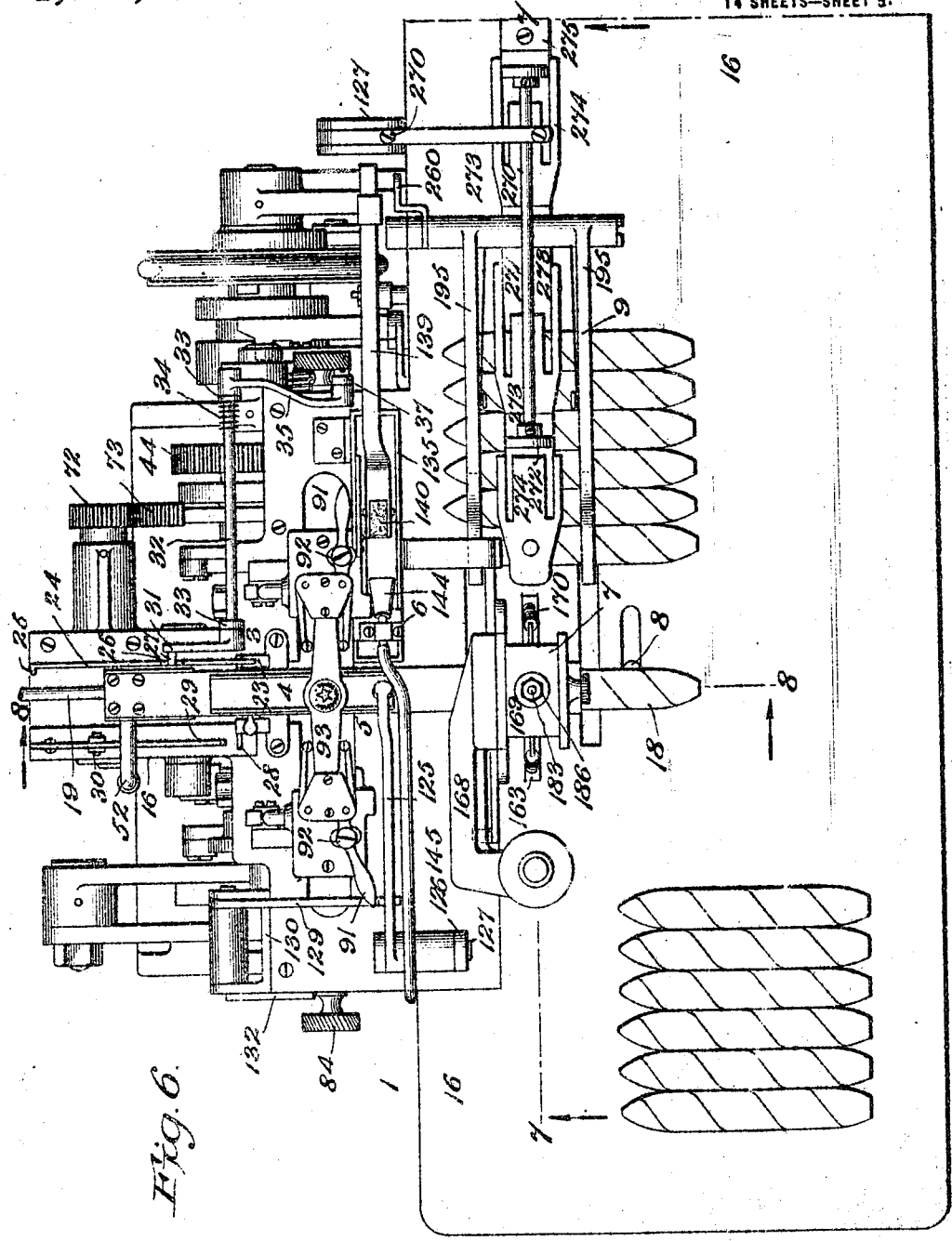

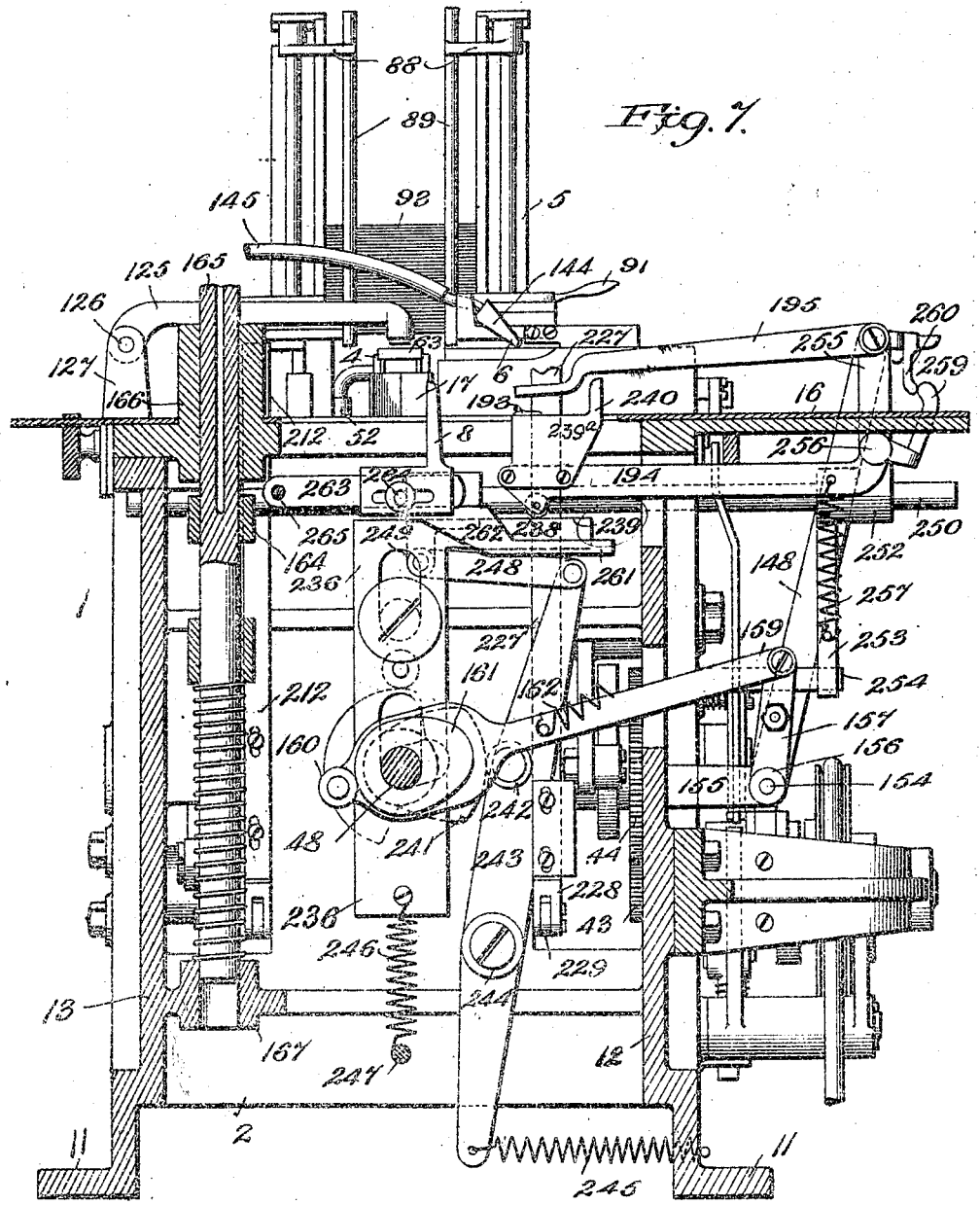

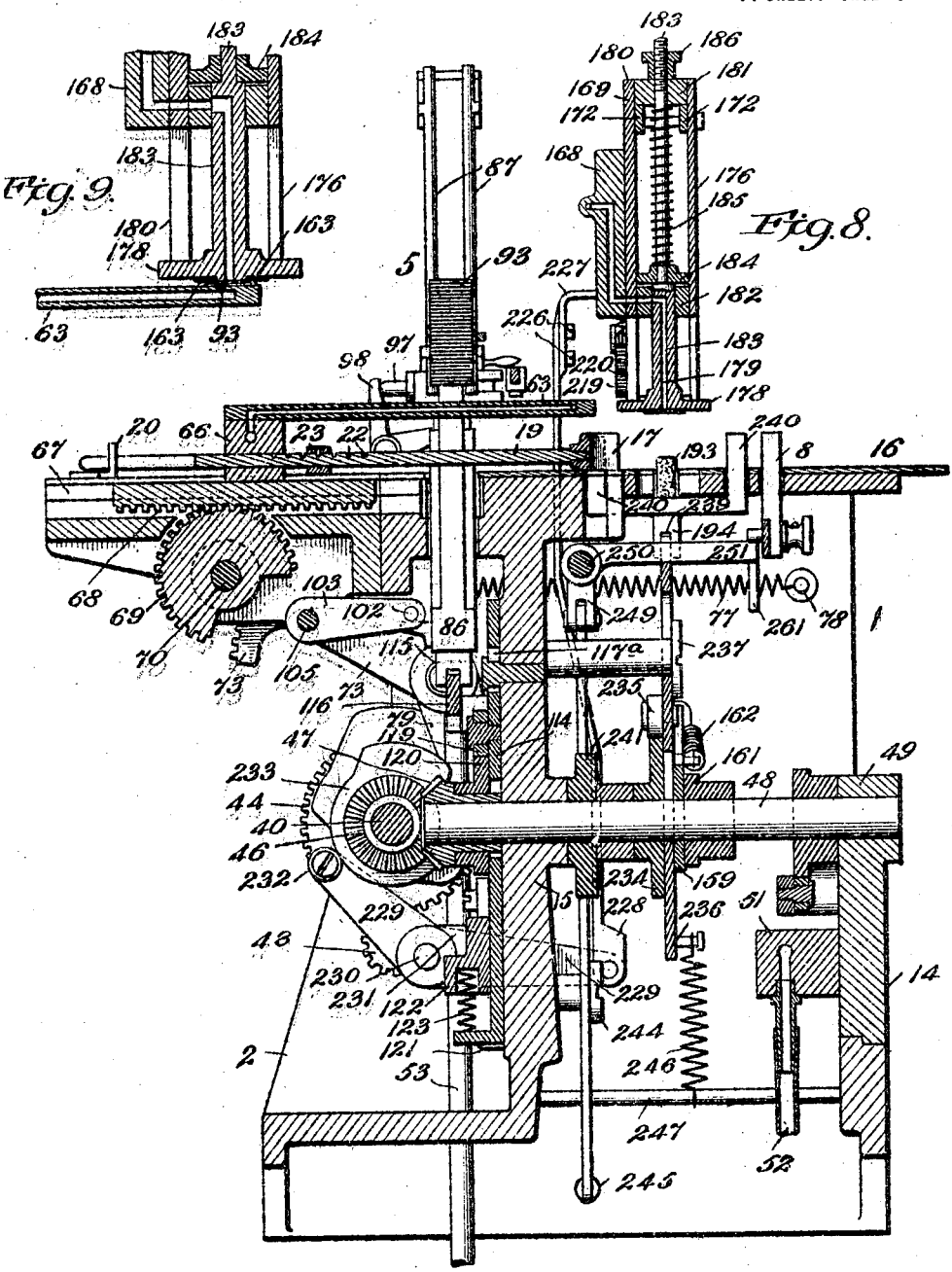

1,261,832.

Patented Apr. 9, 1918.
14 SHEETS—SHEET 8.

Inventor
Francis X. Malocsay
By his Attorney

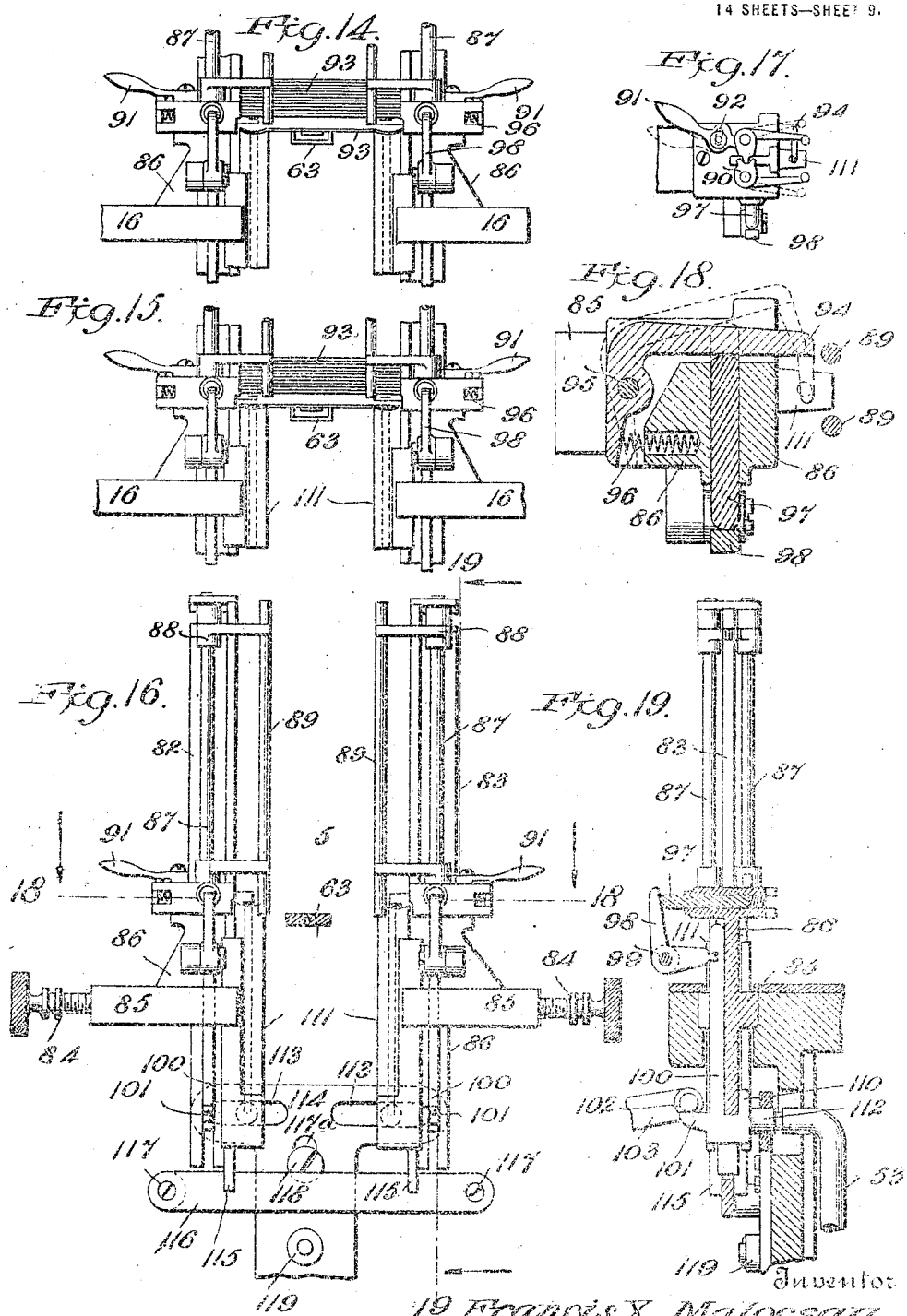

F. X. MALOCSAY.
CIGAR BANDING MACHINE.
APPLICATION FILED MAY 11, 1916.
1,261,832.
Patented Apr. 9, 1918.
14 SHEETS—SHEET 10.
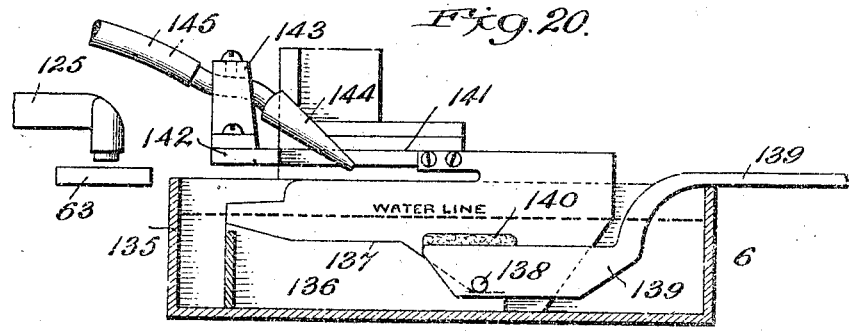
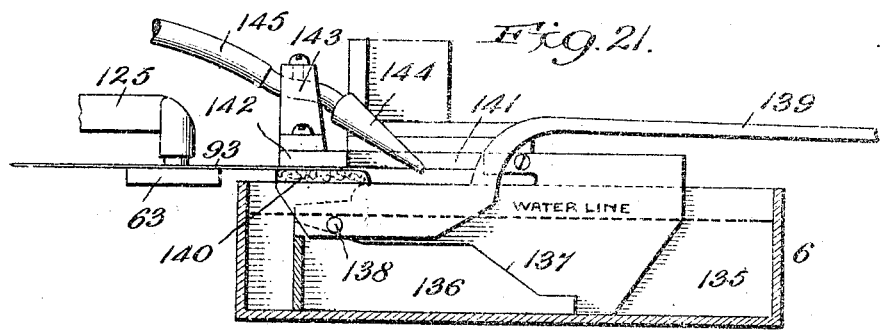
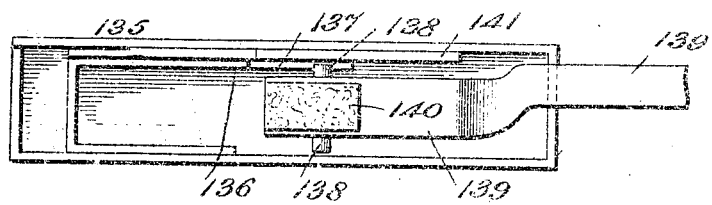
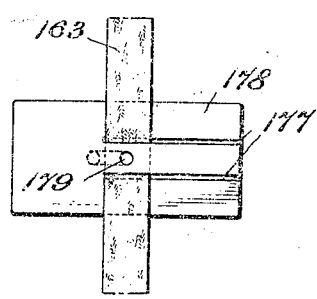
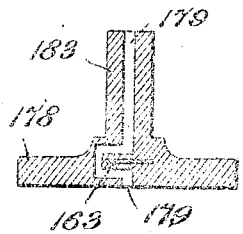
Inventor
Francis X. Malocsay
By his Attorney

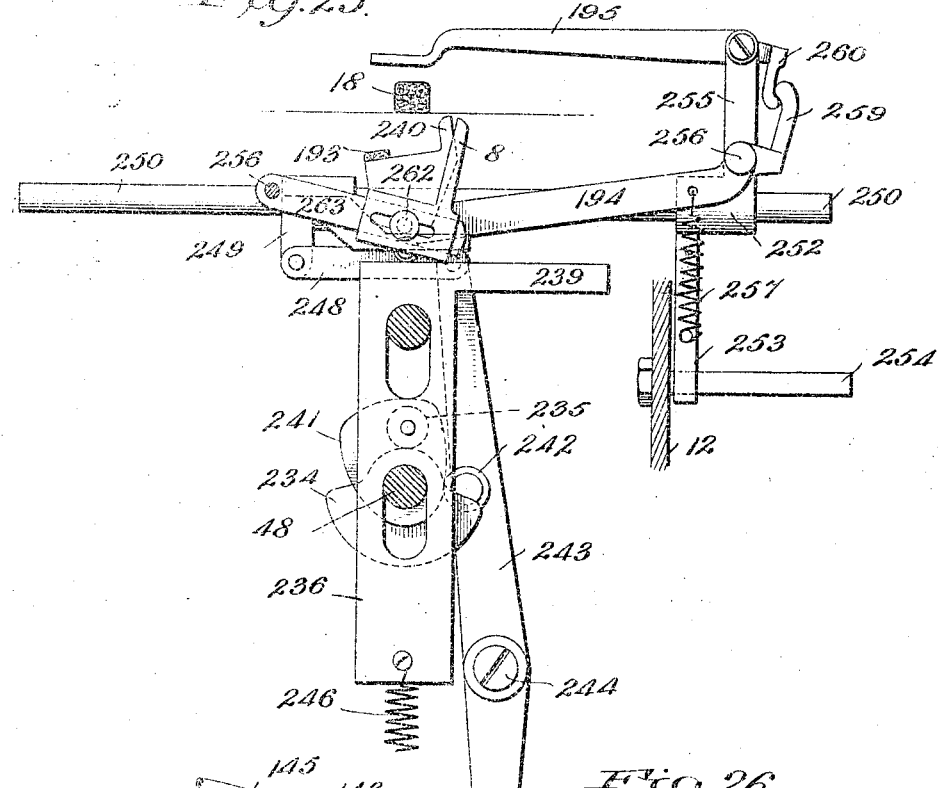
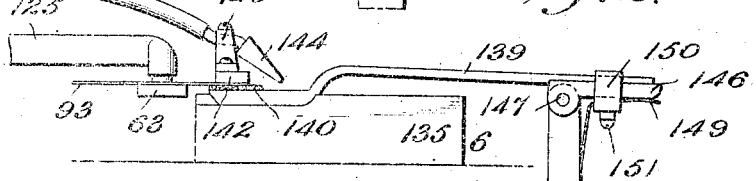
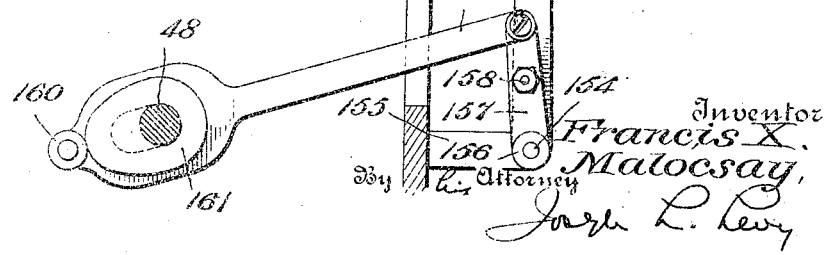

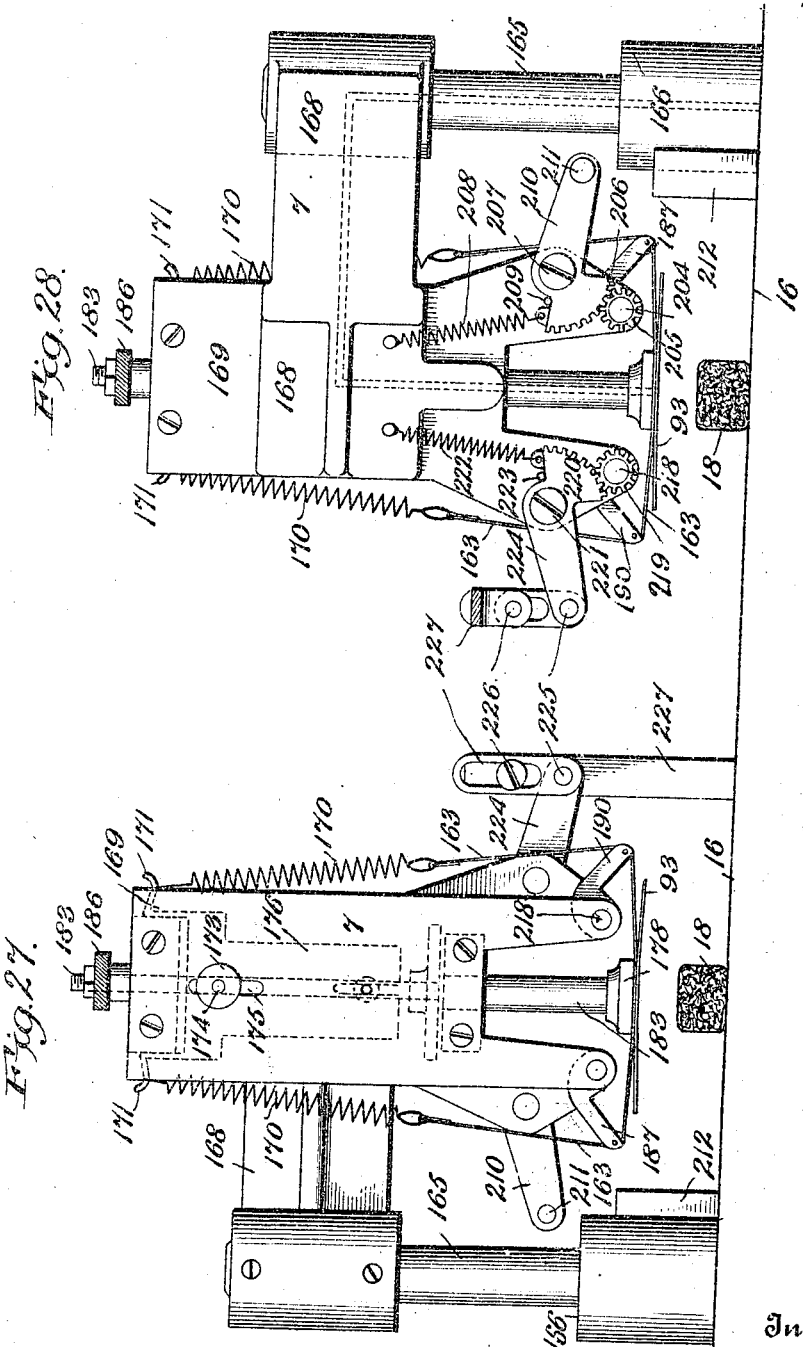

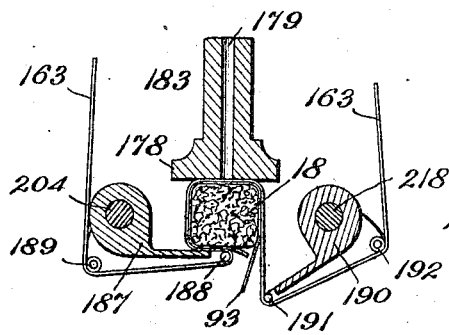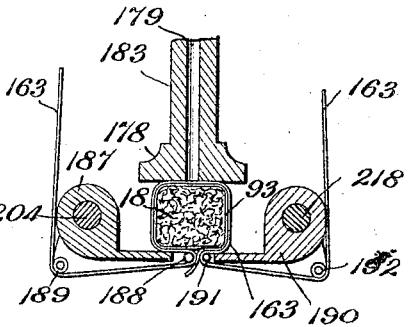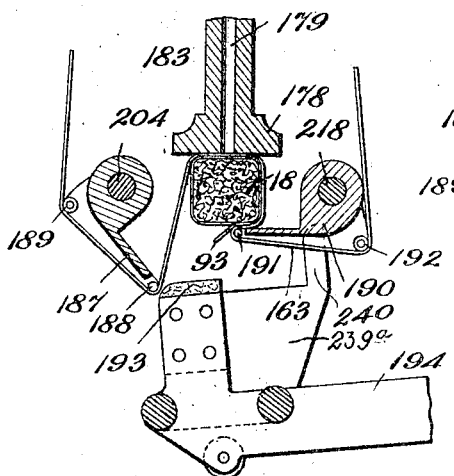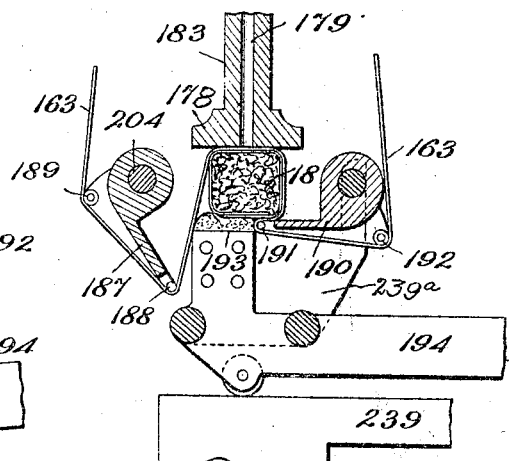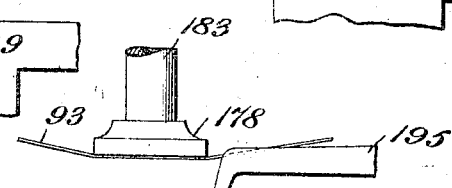

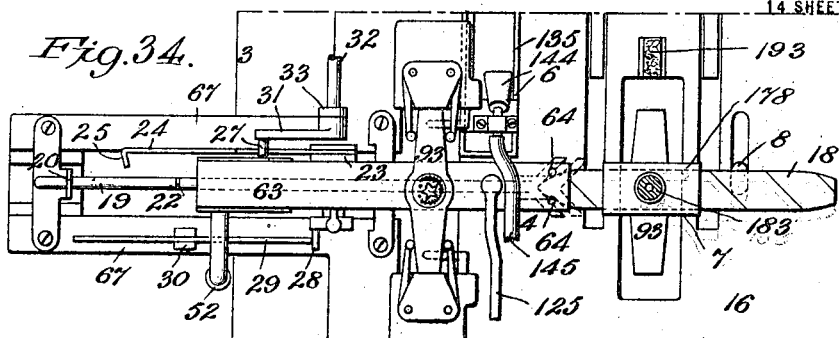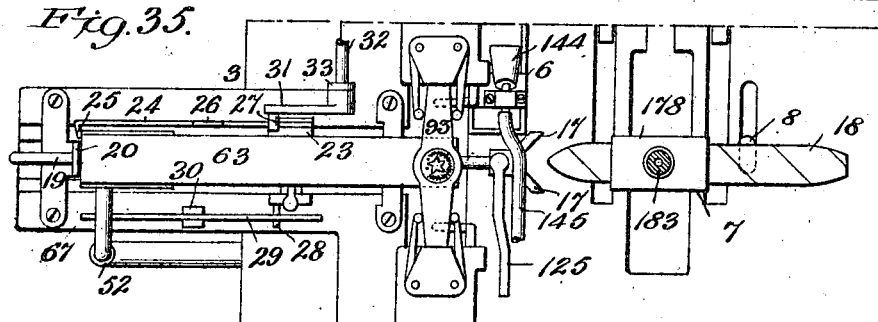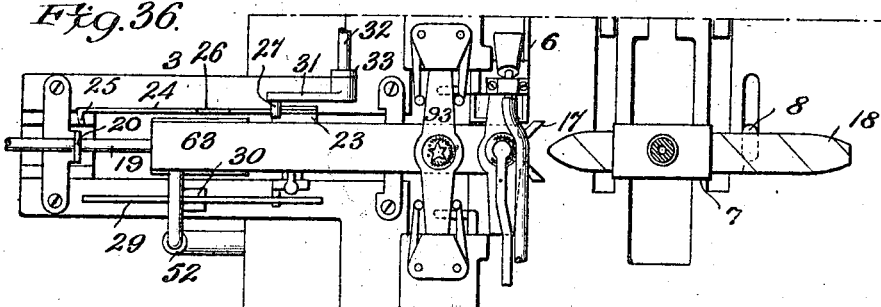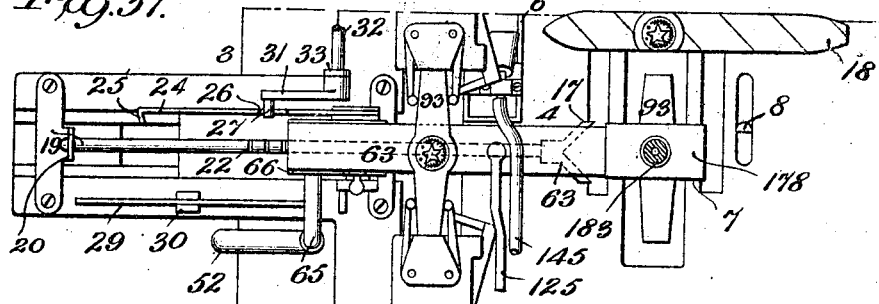

UNITED STATES PATENT OFFICE.

FRANCIS X. MALOCSAY, OF NEW YORK, N. Y., ASSIGNOR TO INTERNATIONAL BANDING MACHINE COMPANY, OF NEW YORK, N. Y., A CORPORATION OF NEW YORK.

CIGAR-BANDING MACHINE.

1,261,832.  Specification of Letters Patent.  Patented Apr. 9, 1918.

Application filed May 11, 1916. Serial No. 96,760.

*To all whom it may concern:*

Be it known that I, FRANCIS X. MALOCSAY, a citizen of the United States, and a resident of the city of New York, county of Bronx, and State of New York, have invented a new and useful Improvement in Cigar-Banding Machines, of which the following is a specification.

The object of my invention is to provide a machine of this class which will securely, accurately and rapidly apply bands to cigars and other articles where an adhesive is used and it is desirable to return the cigars to the box whence they came without turning them in any way, so that if they happen to be dried they will go back exactly as they came out, and thereby escape all injury. This object is accomplished by my invention, one embodiment of which is hereinafter more particularly set forth.

For a more particular description of my invention, reference is to be had to the accompanying drawings, forming a part hereof, in which—

Fig. 4 is a side elevation taken at the left of Fig. 1 and the right of Fig. 2, parts being broken away to reveal the mechanism;

Fig. 5 shows a cam and its connected parts;

Fig. 6 is a plan view of my improved machine;

Figure 10:
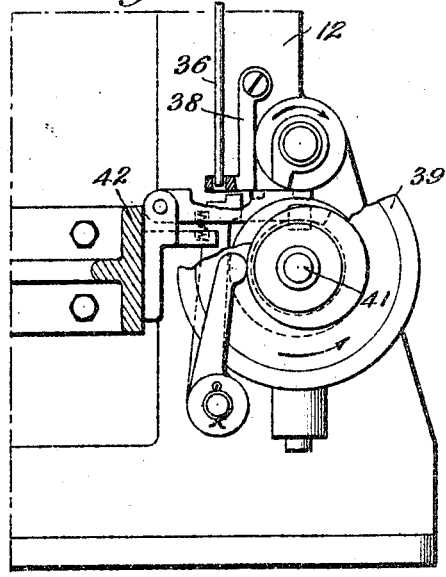
Figure 11:
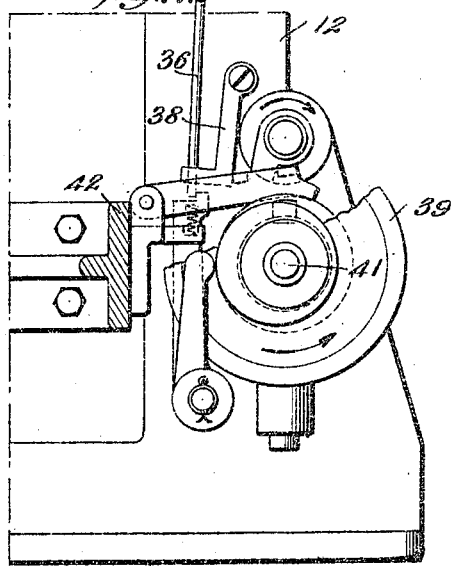
Figure 12:
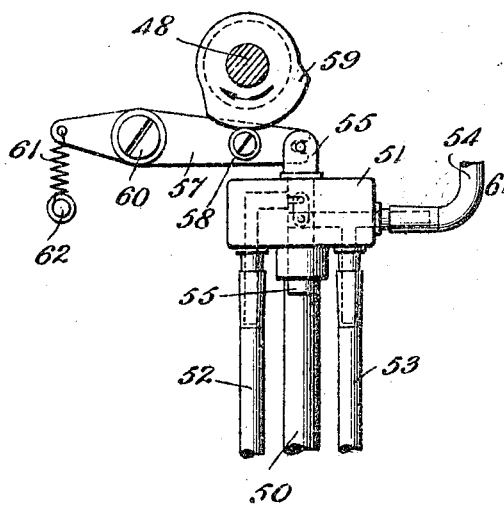
Figure 13:
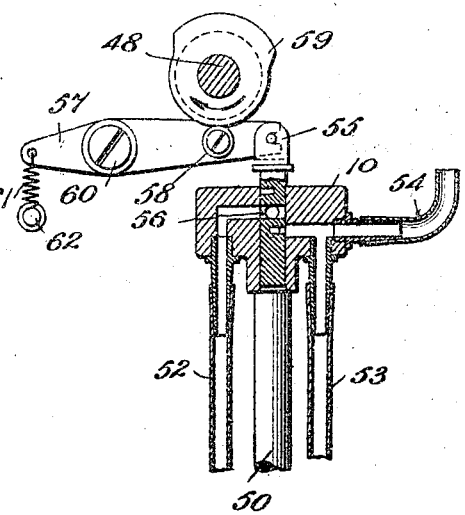

Figs. 7 and 8 are sectional views, taken on the lines 7—7 and 8—8 respectively of Fig. 6, looking in the direction of the arrows;

Fig. 9 is a sectional view, somewhat enlarged, showing a detail of the banding mechanism;

Figs. 10 and 11 show the starting and stopping mechanism;

Figs. 12 and 13 show a detail of the pneumatic part of the apparatus;

Figs. 14 to 19 inclusive show the details of the band supporting and delivering mechanism. Figs. 18 and 19 being sectional views, taken on the lines 18—18 and 19—19 respectively of Fig. 16;

Figs. 20 to 22 are detail views showing the device for moistening the gum on the labels;

Figs. 23 and 24 are detail views showing portions of the band applying mechanism;

Fig. 25 is a sectional view showing a part of the cigar removing mechanism;

Fig. 26 is a sectional view showing a detail of the gum moistening mechanism;

Figs. 27 and 28 are front and rear views respectively of the band applying mechanism;

Figs. 29 to 33 inclusive show further details, in section, of portions of the band applying mechanism;

Figs. 34 to 37 inclusive are plan views of a cigar being banded by my improved machine.

Throughout the various views of the drawings, similar reference characters designate similar parts.

My improved machine 1 is provided with a frame 2 on which is mounted the starting and stopping mechanism 3, the conveying mechanism 4, the band holding mechanism 5, which not only stores the bands but conveys them one at a time to the conveying mechanism, the moistening mechanism 6, the wrapping mechanism 7, the guiding mechanism 8, the ejecting mechanism 9 and the pneumatic mechanism 10 for providing an exhaust, where required, for some of the other elements of machine.

These various elements will now be described.

The frame.

The frame 2 is provided with a base 11 from which rise the sides 12 and 13 and front 14 and rear 15 of the machine. These are surmounted by the table 16. These respective parts are connected with various mechanisms and devices as will appear below, when such parts are described.

The starting and stopping mechanism.

The starting and stopping mechanism 3 had best be described beginning with the part or head 17 which is engaged by the end of the article to be banded, as a cigar 18. This head 17 rests on the top of the table 16, and at its forward end has a crotch, which is so large and deep as to make it flare outwardly to the right and left so as to readily guide the article through when engaged therewith. The head 17 is fixed to a rod 19 which runs clear through to the rear of the machine. This rod 19 at the rear of the machine passes through a suitable guide 20 which is fixed to the table 16 of the machine by means of a cap screw 21, or any other suitable means. This rod 19 is also recessed at 22 so as to receive a spring pressed pawl in the adjustable block 23 which may be placed in any suitable location upon this rod, as indicated, according to the length of the article to be banded. This block 23 carries a strip 24 with a hook 25 at its rear end for a purpose which will appear below. The strip 24 also has a cam recess 26 adapted to engage a pin 27 to start the mechanism in a manner which will be described. The collar or block 23 at its other side is provided with a projecting pin 28 which at times limits the rearward movement of the rod 19 to which it is secured by abutting against the end of a lever 29, pivoted at 30 in an upright rising from the table 16, and at other times this lever 29 is raised at its front end and lowered at its rear end by mechanism described below so that the pin 28 may pass under this lever. At this time it is sufficient to say that when a cigar 18 is shoved against the head 17 the rod 19 is shifted to the rear until the pin 28 engages the end of the lever 29 to limit the rearward movement of this rod 19. At such a time the strip 24 is shifted so that the pin 27 is raised out of the cam recess 26 and thereby elevated, and this crank pin then elevates the free end of the crank 31 to which it is fixed, and this crank is fixed to a shaft 32 journaled in suitable bearings 33 and this crank pin 27 is kept against the strip 24 by means of a suitable coil spring 34 which is secured at its ends so as to act in the conventional manner, to bring this about.

The end of the shaft 32 which is remote from the crank 31 is provided with a second crank 35 placed as shown, and the free end of this crank 35 is pivotally connected to a vertically disposed rod 36 by means of a loose pivot 37, and the lower end of this rod 36 passes through a swinging guide 38, which is pivotally mounted on the side 12 of the frame 2.

The lower end of the rod 36 is normally out of engagement with the dog-clutch 39, but may enter into engagement therewith, and will do so when this lower end is lowered, and at such a time this clutch will act so as to cause the main shaft 40 of the machine to make one complete revolution and no more and no less. It is unnecessary to describe the clutch 39 in detail because it is a well known clutch, and forms no part of this invention. The same is true of the belt which drives it. This clutch 39 is mounted on a stud shaft 41 which is journaled at one end in a bracket 42, and at its other end in the side 12. At its inner end this shaft 41 has a pinion 43 which meshes with a corresponding gear 44 fixed on the main shaft 40 and the shaft 40 is suitably journaled in the sides 12 and 13. In addition to the clutch 39 the shaft 41 carries a suitable brake mechanism 45 which will bring it to rest promptly upon the release of the clutch, as is usual in such cases.

Near the center of the shaft 40 is fixed a suitable miter-gear 46 which meshes with a corresponding gear 47 on a shaft 48 which is journaled at its front end in a bearing 49 in the front 14 of the machine, and near its rear end in a suitable bearing in the rear 15 of the machine. The gears 46 and 47 are identical so that the shafts 40 and 48 run with the same angular velocity and always turn together and always stop and start at the same instant according to the action of the clutch mechanism referred to above.

*The pneumatic mechanism.*

The pneumatic mechanism 10 will now be described for the reason that it is connected with both the conveying mechanism 4 and the band holding mechanism as well as the band applying mechanism. The exhausting means which are utilized with my machine are not shown as a part of this machine, as this means may be of any suitable kind of exhausting apparatus. For the purposes of this case it is sufficient to say that such a mechanism is connected to the machine by means of a tube 50 which runs to a valve casing 51 which is fixed to the front 14 of the frame 2 of the machine, and this casing has three ports or outlets 52, 53 and 54 respectively. The tube 52 is connected with the conveying mechanism 4; the tube 53 is connected with the band-holding and delivering device, and the tube 54 is connected with the band applying device. The tubes 53 and 54 are exhausted at the same time and not at the time when the tube 52 is exhausted. This is accomplished by means of a suitable plug 55 mounted in the valve casing 51 and this plug is pivotally connected at its upper end, as will be described below, and it is also provided with suitable ports 56 through which the tube 50 may be connected with the tube 52 on the one hand, or the tubes 53 and 54 on the other. The valve stem 55 is connected by a suitable pivot to the cam-lever 57, which is provided with the usual cam roller 58 which engages a cam 59 which is fixed to the shaft 48. The lever 57 is fulcrumed on a pin 60 fixed in the front 14 of the machine and its free end is connected to a spring 61 which is also connected to a pin 62 which is fixed in the front 14° of the machine. From the foregoing it is apparent that the rocking of the lever 57 under the influence of the cam 59 determines when the respective tubes shall be exhausted.

*The conveying mechanism.*

The conveying mechanism 4 has a horizontally disposed tube 63 which is tubular in form and provided with two exhaust ports 64 which are adapted to secure a band or label at the proper time, and not otherwise. These ports in the part 63 are connected to the tube 52 by means of a nipple 65 which is fixed to a cross-head 66 on the upper surface of which is the horizontally disposed tube 63. The lower edges of the cross-head 66 are laterally extended so as to enter the sides 67 which project rearwardly from the table 16, so that the cross-head is capable of a front and rear motion between said guides, and of no other motion. The bottom of the block 66 is also extended front and rear and provided with a set of teeth which form a rack 68 which mesh with corresponding teeth 69 on a segmental gear which is fixed to a shaft 70 that is journaled in suitable bearings 71 at the rear of the machine, and the shaft 70 is extended to a pinion 72 which meshes with a segmental gear 73 which is fixed to a boss 74 mounted on a shaft 75 on the side 12 of the frame of the machine, and this boss is provided with an upwardly extending arm 76 which is adapted to engage a suitable coil spring 77 which is secured to a pin 78 projecting from the side 12 of the machine, and this boss 74 is provided with another arm 79 which carries a cam roller 80 at its lower end in the conventional way, which rides on a cam 81 fixed on the main shaft 40 of the machine. This cam 81 is so shaped as to give the required rocking movement to the arm 79 which transmits this movement through the mechanism above described, so as to produce a proper reciprocation of the conveyer 4 at the time required and in the right direction.

*The band holding and supplying mechanism.*

The band supplying mechanism 5 is mounted for the most part on top of the table 16 and it is provided with the adjustably mounted and vertically disposed guides 82 and 83 and is slotted so as to permit these guides to move toward or from each other according to the way in which the adjusting screws 84 are turned to provide for this shifting of position. As these guides 82 and 83 are substantially identical, a description of one will answer for both. These guides differ only in the fact that one is right and the other left, so that one will correspond and coöperate with the other. Each guide has a base 85 in which an adjusting screw 84 turns, and from this base rises an upright 86 in which the vertically disposed shafts 87 are mounted. These shafts 87 carry arms 88 which are fixed thereto, and arms on each shaft are connected by the vertically disposed rods 89. The shafts 87 are geared together by means of suitable gears 90 mounted at their ends so that they will swing in opposite directions, so that the rods 89 and the arms 88 may be separated or brought together. To one of the rods 87 of each guide is fixed a suitable handle 91 so that these rods may all be given an angular movement, and a suitable securing device 92 is connected to this handle 91 so that the rods may be secured in the position in which they may be placed. By means of these rods 89 the labels or bands 93 may be properly centered and kept in proper alinement while awaiting removal, in a manner which will be described below.

The bases 85 carry the supporting dogs 94 which carry the labels 93. These dogs are placed in suitable slots and pivoted at 95, and normally kept in position by means of suitable coil springs 96 placed separately as shown in Fig. 18. They may, however, be shifted by means of bolts 97 which are also slidably mounted in the bases and adapted to be shifted by means of suitable bell crank levers 98, (see Fig. 19) fulcrumed at 99 on pins extending from the uprights 86, and the other ends of these bell crank levers 98 engage suitable grooves in slides 100 which carry a projection 101 which is engaged by a cam roller 102, on an arm 103, (see Fig. 8) which is fixed to a boss 104 which is fixedly mounted on a shaft 105, which is journaled in suitable bearings 106, fixed to the rear of the machine, and one of the bosses 104 has a downwardly extending arm 107 which is provided with a suitable cam roller 108 which engages a corresponding cam 109 fixed to the main shaft 40 of the machine. By means of this connection the bell crank levers 98 are given a timely oscillation. The slides 100 are made to move properly in the direction of their length and not otherwise, in the uprights 86, suitable grooves being provided for this purpose, and they are also given a rearwardly and upwardly extending projection 110 which facilitates their operation (see Fig. 19). This projection takes back of the upright 86.

The uprights 86 of the guide also carry the reciprocating tubes 111 which run vertically in suitable guideways provided for the purpose, and have their upper ends below the dogs 94. These tubes 111 have nozzles 112 which engage a suitable slot 113 in the slide 114. The slots 113 are horizontally disposed and sufficiently long to permit the proper adjustment of the guide through the screws 84. The tubes 111 are each connected with the exhaust tube 63 as shown.

The lower ends of the tubes 111 are provided with suitable crotches 115 which straddle the cross-bar 116 which is secured by screws 117 from the rear 15 of the machine. This bar is clear of the slide 114. The slide 114 has suitable and vertically disposed slots 117ᵃ in which is mounted a suitable cap-screw 118 on which it may ride when raised by a cam roller 119 which turns on a suitable cam 120 which is fixed to the bevel gear 47 on the cam shaft 48. The lower end of the slide 114 carries a suitable bracket 121 which takes into a corresponding socket in a projection 122 fixed to the rear 15 of the machine. The projection 121 is separated from the bottom of the projection 122 by means of a suitable coil spring 123. The socket 122 may be secured in place by any suitable means, as by screws 124. The spring 123 acts so as to keep the cam roller 119 constantly against the cam 120 so that this roller is shifted by said cam so that the slide 114 moves in a vertical direction only and reciprocates according to the surface of the cam. These reciprocations cause a timely raising and lowering of the tubes 111.

In view of the foregoing the operation of the band-holding and separating mechanism will be readily understood. The handles 91 are shifted so that the rods 89 are separated and then a pile of bands 93 is put in position with the lowermost band having its ends resting on the dogs 94, and then the handles 91 are again shifted until the bars 89 approach each other and properly center the bands. When this is done the screws 92 are tightened, and then the bands are properly centered and held ready for the operation of the machine. Then the tubes 111 are raised and the dogs 94 are withdrawn, and then the lowermost bands rest on the tubes 111, so that the ends of lowermost band only are away from their fellows onto the concave upper surface of each tube 111. The dogs 94 are then restored and are above the ends of lowermost bands and support all the other bands, and then the tubes 111 are lowered very slightly so as to have the lowermost surface of the lowest band 93 at the level of the upper surface of the conveyer 63. The exhaust is then cut off from the tube 111 and turned on to the tube 63 with its ports, and then the band 93 is released entirely from the tube 111 and secured to the conveyer 63 which carries it forward for the operation which will be described below. This operation is repeated indefinitely as the machine performs its operations on the various articles submitted to it.

*The moistening mechanism.*

From the band holding and delivering mechanism 5 the conveyer 4 carries a band to the moistening mechanism 6, and this moistening mechanism will now be described. It will be understood that the bands are placed in the band holder 5 so that the gummed ends are down and the finished sides are up. The conveyer carries the gummed end to the moistener 6 where the end is moistened, in a manner which will be disclosed. To prevent any turning during this moistening operation, or any shifting of the band on the conveyer, it is desirable, although not essential, to employ a clamping finger, which will now be described. This clamping finger 125 is pivoted at 126 in suitable ears 127 that rise from the table 16. It is normally kept with a tendency to have its free end rest on the conveyer 63 by means of a coil spring 128 which is connected both to the table 16 and the finger 125, in any suitable manner. To prevent this finger from pressing on the conveyer 63, except at the desired moment, it is usually kept elevated by means of a bent lever 129, which is pivoted in suitable ears 130 fixed on the rear of the machine, and the lower end of this lever 129 has a cam roller 131 which runs on a cam 132 fixed on the main shaft 40 of the machine. A pin 133 runs laterally from the lower part of the lever 129 and is connected to a coil spring 134 which is secured at its other end in the frame 2. This spring 134 is more powerful than the spring 128 so that the cam roller 131 is kept against its cam 132, and the finger 125 is kept elevated except when the cam 132 permits it to be lowered.

The moistener 6 is shown in a general way in many of the views, and in detail in Figs. 20 to 22 inclusive and Fig. 26. This moistener consists of the trough 135 and the parts connected therewith, which will now be described. This trough carries a cam 136 on the upper edges of which ride pins 138 fixed in the reciprocating rod 139 which is reciprocated by mechanism which will be described below. It is sufficient to say that it is thrust forward and back in the general direction of its length, and gets its vertical movement from the cam edges 137 upon which the pins 138 ride. A pad 140 is put on the upper forward surface of this rod 139, and this pad 140 is carried both above and below the water level line as shown in Figs. 20 and 21 by the reciprocation of the rod 139. A plate 141 is secured to the tank 135 and to the upper and forward edge of this plate 141 is secured a suitable bracket 142 by screws or any other suitable means. This bracket 142 has a flattened lower surface adapted to receive the upper surface of a band 93 when the pad 140 is moistening the gummed surface immediately below the same, as shown in Fig. 21, and it also carries a support 143 in which is secured a nozzle 144 with an elongated, flat opening at one end and a tube 145 secured at the other. Fresh air is forced through the tube 145 and out of the nozzle 144 at any desired pressure so as to dry the pad 140, to some extent, and blow any loose water off the same, so that too much moisture will not be applied to the paste on the label 93. Just the pressure required will depend on the humidity, so that pressure required for the tube 145 will have to be regulated by trial and changed from day to day as the humidity changes and even from hour to hour. Under normal conditions where the humidity remains the same for some time, then the pressure may remain unchanged for many days. At other times frequent changes in one day may be necessary. In any event it is desirable that each band should have the proper amount of moisture on its gummed surface and no more so that it will adhere properly when the operations described below are carried out. The source of compressed air for the tube 145 is not shown, and may be any suitable source.

From Fig. 21 it is apparent that when the band 93 is being moistened as shown, it is clamped securely by the finger 125 which presses it against the tube 63, so that in addition to the pneumatic pressure there is the positive pressure of this finger to clamp this band securely in its place and prevent all displacement during the moistening operation.

The mechanism for reciprocating the rod 139 will now be described. At its end remote from the pad 140 this rod is fixed on a plate 146, which is pivoted at 147 to the vertically disposed rod 148 and kept normally in proper position by a leaf spring 149 which presses against the rod 148 and the plate 146. A suitable clamp 150, with a set screw 151 holds the plate 146, the rod 139 and the spring 149 in proper relation, as indicated in Fig. 26.

The rod 148 runs to a suitable boss 152ᵃ (see Fig. 3), which is fixed to a short shaft 154 which is pivotally mounted to a bearing 155 which extends laterally from the side 12 of the frame 2 of the machine. The shaft 154 has a second boss 156 fixed thereon, and from this boss 156 runs a second arm 157 parallel with the rod 148 and cross connected with it by means of a suitable stud 158, as shown. The upper end of the arm 157 is pivotally connected to a link 159 which is enlarged at its other end, and slotted so as to receive and fit over the shaft 48, and the extreme end of this rod 159 carries a suitable cam roller 160 which engages the base of a cam 161, which is fixed on the shaft 48, so that as this shaft 48 rotates so does this link 159 reciprocate pursuant to the dimensions of the cam 161. A suitable spring 162 keeps the cam roller 160 against the cam 161. One end of this spring is secured to the rod 159 and the other to the frame 2 of the machine. From the foregoing it is apparent that the shape of the cam 161 is such that the rod 139 receives timely reciprocations which are essential for the proper performance of its function.

*The band applying mechanism.*

From the band moistening mechanism the conveyer 4 takes the band to the band applying mechanism, which places this band about a cigar or other article which has been used to start the machine and is ready to receive the band. The operation of this part, as well as its structure, will now be described.

The action of the banding mechanism is best understood by referring at first to Figs. 27 to 33 inclusive. In Figs. 27 and 28, a band 93 is shown on the banding mechanism where it has just been received from the conveying mechanism 4, the exhaust permitting this as it was shut off the conveying mechanism 4 just prior to being put on to the banding mechanism 7. After the band 93 is removed from the conveyer 4, as above described, it is held in contact with the tape 163 in the banding mechanism 7 through the exhaust which is connected with the tube 54 which has been described above. At this time it is sufficient to say that this exhaust 54 passes through a suitable connection 164 to the hollow stem 165, which is mounted so as to reciprocate in a vertical direction in suitable guides 166 and 167, as shown in Fig. 7. The means for reciprocating this rod 165 will be described below. The upper end of this rod 165 is connected to a horizontally disposed bracket 168, and to this bracket is fixed a head 169, so that the head 169 will rise and fall with the rod 165, in a manner which will be described. The part attached to this head 169 has a slight and independent reciprocating motion which will also be described below. The ends of the tape 163 are connected to suitable coil springs 170 which run to hooks 171 which are in turn connected to the adjustable bracket 172 which is held in place by means of a nut 173 which is on a screw 174 which passes through a slot 175 in the front face plate 176 of the head 169. By loosening this nut 173 and raising it up or down and then tightening it, it is possible to loosen or tighten the tension on the springs 170 and thereby loosen or tighten the tension on the tape 163, as is obvious. The tape 163 may be perforated to avoid interfering with the suction, but the preferable way to secure it at its center is to pass it through slots 177 in the platen 178 and to pass the port or opening 179 about the same, as shown in Figs. 23 and 24. The port 179 is connected with the interior of the tube 54, as above described, through the head 169, bracket 168 and rod 165. In addition to the front plate 176 the head 169 carries the rear plate 180 which runs parallel to the plate 176, and the two plates are connected together by the top 181 and the bottom 182, and the bottom 182 is perforated so as to provide not only for the port 179, but also for the stem 183 of the platen 178. The stem 183 is reduced at its upper end and provided with a crosshead 184 which normally rests close or on the bottom 182 and slides between the plates 176 and 180, and on top of this crosshead 184 is a coil spring 185 which has its upper end against the part 181. The extreme upper end of the stem 183 is screw-threaded so as to be capable of adjustment by means of the nut 186. By turning the nut 186 the stem 183 may be raised or lowered with or against the tension of the spring 185. These details are shown in Fig. 8.

When the band 93 has been received from the conveyer arm 63, as shown in Fig. 9, and the arm has been withdrawn as indicated in Figs. 27 and 28, the head 169 is lowered until the band 93 rests on the article to be banded, as shown in Fig. 29. The band 93 is then placed about the article 18, as follows: First, the finger 187 is actuated by mechanism described below, to place one end of the band, not the gummed end, at one side of the cigar or other article 18, as shown at the left of Fig. 29. This finger 187 is provided with suitable pins or guides 188 and 189 to facilitate this operation. As soon as this is done the finger 190 on the other side will become active and bring the gummed end of the tape to the position shown in Fig. 29, the pins 191 and 192 facilitating this operation. The next operation is to close the finger 190 so that it will be in the position shown in Fig. 30 and thereby hold the band about the article with the gummed end hanging down, and not secured. The finger 187 is then withdrawn as shown in Fig. 31, and a pad 193 mounted on a suitable arm 194, is then raised, as shown in Fig. 32, so as to close the joint by pressing the gummed surface to its true position where it remains. Thereafter two fingers 195 rest on the article, one on each side of the platen 178, and hold the article for a moment prior to the action of the ejecting mechanism. Meanwhile the platen 178 is raised by the raising of the rod 165. Thereafter the ejecting mechanism acts and takes the banded article away from the banding mechanism.

The various mechanisms for actuating the above mentioned parts of the banding mechanism will now be described, beginning with the means for reciprocating the rod 165. The rod 165 is reciprocated by the means shown in Figs. 4 and 5. From these views it is apparent that this rod carries a suitable collar 196 to which is pivotally connected a link 197, and this link is pivotally connected to a cam lever 198 which, at its rear end, is pivoted at 199 to an ear 200 that extends from the rear of the machine. This lever 198 is provided with a suitable cam roller 201 which engages a corresponding cam 202 on the main shaft 40. The roller 201 is kept against the cam 202 by means of a coil spring 203 which rests on the guide 167 and under the collar 196 and surrounds the lower part of the rod 165. It is obvious that the pressure of this spring acting upwardly will keep the cam roller 201 against the cam 202, as above specified.

It is also obvious that the rod 165 and the part carried thereby will reciprocate up and down according to the cam surface of the cam 202.

The means for actuating the fingers 187 and 190 will now be described. The finger 187 is fixed to a shaft 204 which is journaled in the plates 176 and 180, at their lower ends, and just in the rear of the plate 180 is fixed a pinion 205 which meshes with a segmental gear 206 which is pivoted at 207, and pulled in one direction by the coil spring 208 which is also secured to the bracket 168, so that it rests normally against the stop pin 209. An arm 210 extends from this gear 206, and this arm is provided with a crank pin 211 which comes in contact with a vertically disposed rod 212 (see Fig. 4) which at its lower end is attached to a clevis 213 which straddles a cam lever 214, which is pivotally connected to an ear 215 which extends from the plate 122, and this lever 214 carries a cam roller 216 which runs on a cam 217 fixed on the main shaft 40 of the machine. The coil spring 208 is interposed when the rod 212 engages the pin 211, to keep this cam roller 216 on the cam 217. It is obvious that the cam 217 is given a suitable shape to cause the bar 212 to reciprocate as required.

The finger 190 is fixed to a suitable shaft 218 which is journaled between the same plates as the shaft 204 and is mounted in much the same way and provided with a corresponding pinion 219 which meshes with a corresponding segmental gear 220 which is pivoted at 221. The segmental gear 220 is connected by a coil spring 222 to the bracket 168 so that this segment is normally held against a stop-pin 223 just as the segment 206 is kept at the stop-pin 209 by the coil spring 208. This segmental gear 220 is provided with a laterally extending arm 224 which is provided with a crank pin 225 which is connected to the bent link 227, which corresponds to the rod 212 and runs downwardly parallel to this rod 212, to a clevis 228 which is pivotally connected with a cam lever 229 fulcrumed at 230 in an ear 231, extending from the bracket 122, and this lever 229 is provided with a cam roller 232 which runs against the cam 233 which is fixed to the shaft 40. The roller 232 is kept against this cam 233 by the tension of the spring 222 which opposes this cam when the rod 227 is active. This cam 223, like the cam 217, is so shaped and timed that the link 227 reciprocates as required to produce the above mentioned motion with the finger 190. The parts of the rod 227 are connected by an adjustable connection 226.

The movement of the pad 193, which supplements the action of the fingers 187 and 190, is a compound movement composed of vertical and horizontal components which are produced in a manner which will now be described. The vertical movement is derived from a cam 234 near the cam 161, and like the cam 161 fixed on the shaft 48. This cam 234 is engaged by a cam roller 235 mounted in the conventional manner in a slide 236, and this slide is slotted so as to straddle the shaft 48, and it is also slotted again at a place higher up so as to straddle a pin 237, as shown in Fig. 8. The upper edge 239 of the slide 236 is flat and horizontal and is extended laterally toward the right of Fig. 1 so as to provide a suitable surface for a roller 238 to run thereon. This roller 238 is suitably mounted in the conventional way in the link or arm 194, and the pad 193 carried on a bracket 239ª is fixed to the arm 194 by set screws or any other suitable means. A part of this bracket 239ª is extended upwardly through a corresponding slot in the table 16 to form ejecting fingers 240 and a part of the ejecting apparatus, as will appear below. The shape of the cam 234 is such that the proper reciprocation is given to the slide 236 to produce the required vertical movement of the pad 193 and the ejecting fingers 240 which are connected therewith.

The means for producing the horizontal movement of the pad 193 is as follows:

The cam shaft 48, near its bearing in the rear plate 15 of the machine, carries a cam 241 which is fixed thereon in the conventional manner. This cam 241 is engaged by a cam roller 242 mounted on a cam lever 243, in the conventional manner, and this lever 243 is fulcrumed at 244 to a pin extending inwardly toward the front of the machine and fixed in the rear 15 of the machine, and at its lower end this lever 243 is provided with a coil spring 245 which connects this lever with the frame, so that the cam roller 242 is kept in contact with the cam 241. A corresponding spring 246 connects the slide 236 with a rod 247 and keeps the roller 235 on its cam 234, as is obvious.

The upper end of the lever 243 is pivotally connected to a link 248, and the other end of this link 248 is pivotally connected to a suitable clevis 249 which is fixed to the reciprocating rod 250 which has suitable bearings in the sides 12 and 13 so that it can reciprocate in the direction of its length under the influence of the cam 241 and spring 245.

Figure 1:
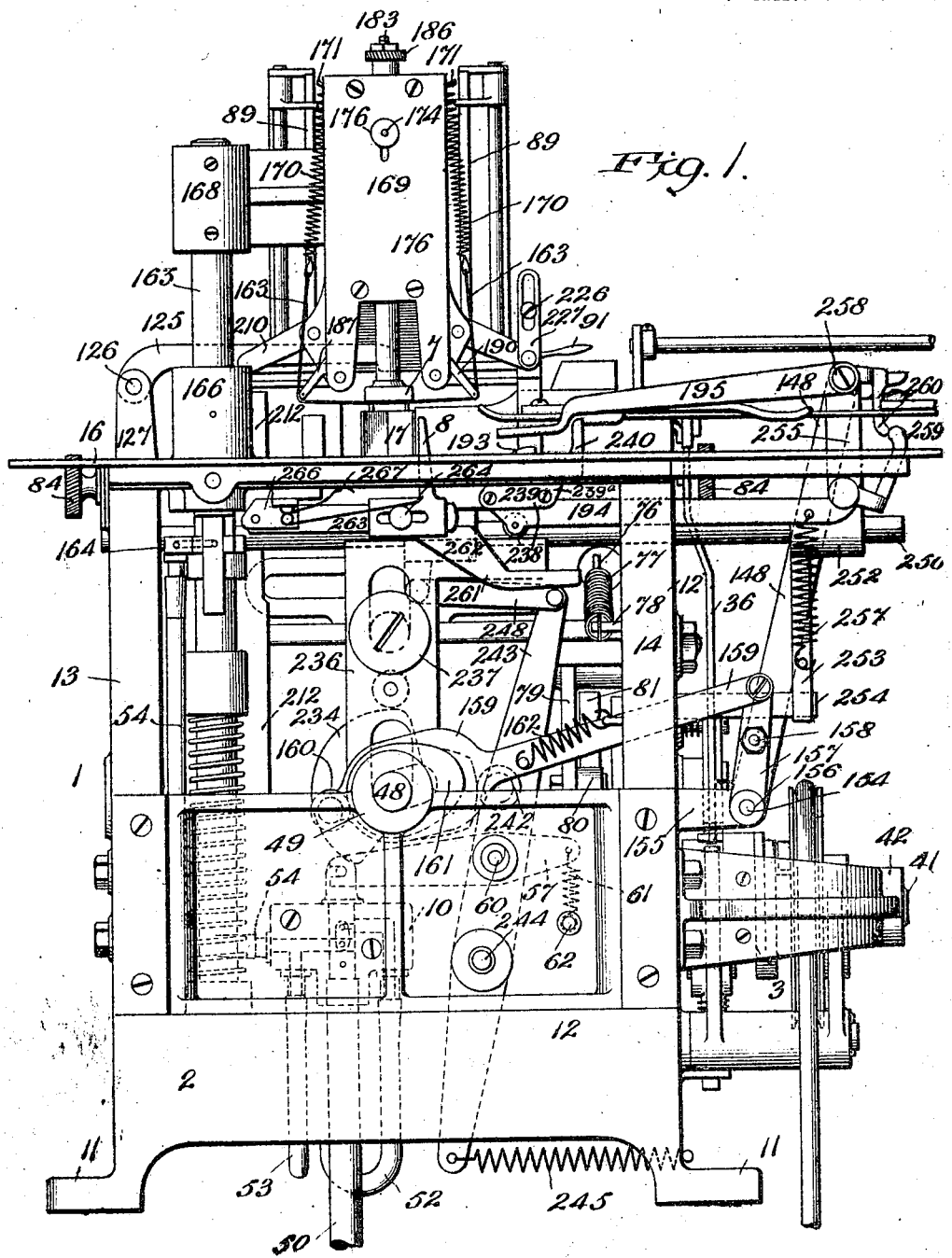
Figure 1 is a front elevation of my improved banding machine.
Figure 2:
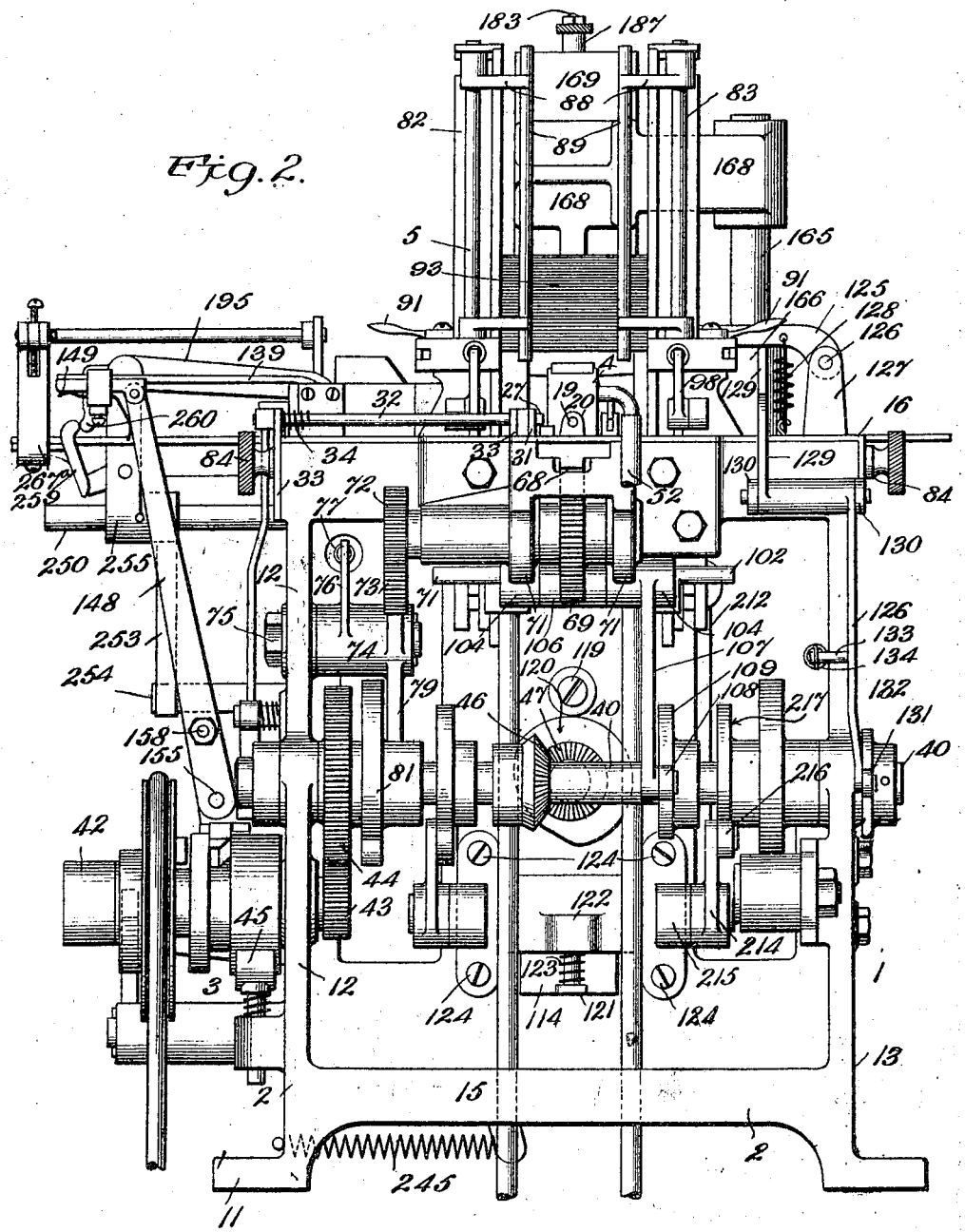
Fig. 2 is a rear elevation of the same.

The rod 250 has fixed thereon, near the clevis 249, a horizontally and laterally extending arm 251, which is connected to the guiding mechanism 8, which will be described below. At another part, and to the right of the side 12 of the machine, this rod 250 carries a collar 252 which is fixed thereon and provided with a downwardly extending projection 253 straddling and sliding over the corresponding stud rod 254 which is parallel to the rod 250 and so permits the rod 250 to slide, but prevents it from turning about its axis. This collar 252 also has an upwardly extending arm 255 with two pivots, an upper and a lower. To the lower pivot 256 is connected the arm 194, and this arm is also connected to the arm 253 by means of a coil spring 257, as shown in Fig. 1. This spring 257 acts to keep the roller 238 on the upper edge of the slide 236. The upper pivot 258, of the arm 255, carries the finger 195 which has been mentioned above. The arm 194 and the finger 195 are also connected by means of integral, laterally running and interengaging projections 259 and 260 respectively, which are placed beyond the pivots 256 and 258 so as to make the other ends swing simultaneously together or apart, so that the part 193 will coöperate with the fingers 195, as shown in Fig. 33, at the proper time. It is obvious that the fingers 195 are spaced apart so as to straddle the platen 178 and not interfere with the same and its connected parts. In Fig. 6 these fingers 195 can be seen extending from a common stem, as above set forth.

*The alining mechanism.*

The arm 251 which is fixed to the clevis 249 and the rod 250, carries fixed thereto, at its forward end, a cam 261 with an upper surface 262, shaped substantially as shown in Fig. 7, that is, with two offset, horizontal portions connected by a diagonally disposed part. The guide 8 is adjustably mounted with a pin and slot connection on a link 263 to which it may be fixed in any desired position, according to the diameter of the cigar to be labeled or banded. This pin and slot connection is designated 264, and the pin thereof extends far enough to engage the cam surface 262, of the cam 261. The link 263 at its end at the left is pivotally connected by means of a pivot 265, to a bracket 266, (see Fig. 1) which is secured to the lower surface of the table 16. A suitable spring 267 presses both against the under surface of the table 16 and the upper surface of the pin connection 264 so as to keep this pin in constant contact with the cam surface 262. From this connection it is apparent that as the rod 250 reciprocates from the right to the left, and vice versa, as above described, the guide pin 8 will be raised or lowered as required, and when so raised or lowered, it will either be ready to guide a cigar to the proper position, or be clear of the table when the cigar is to be ejected.

The ejecting mechanism.

Figure 3:
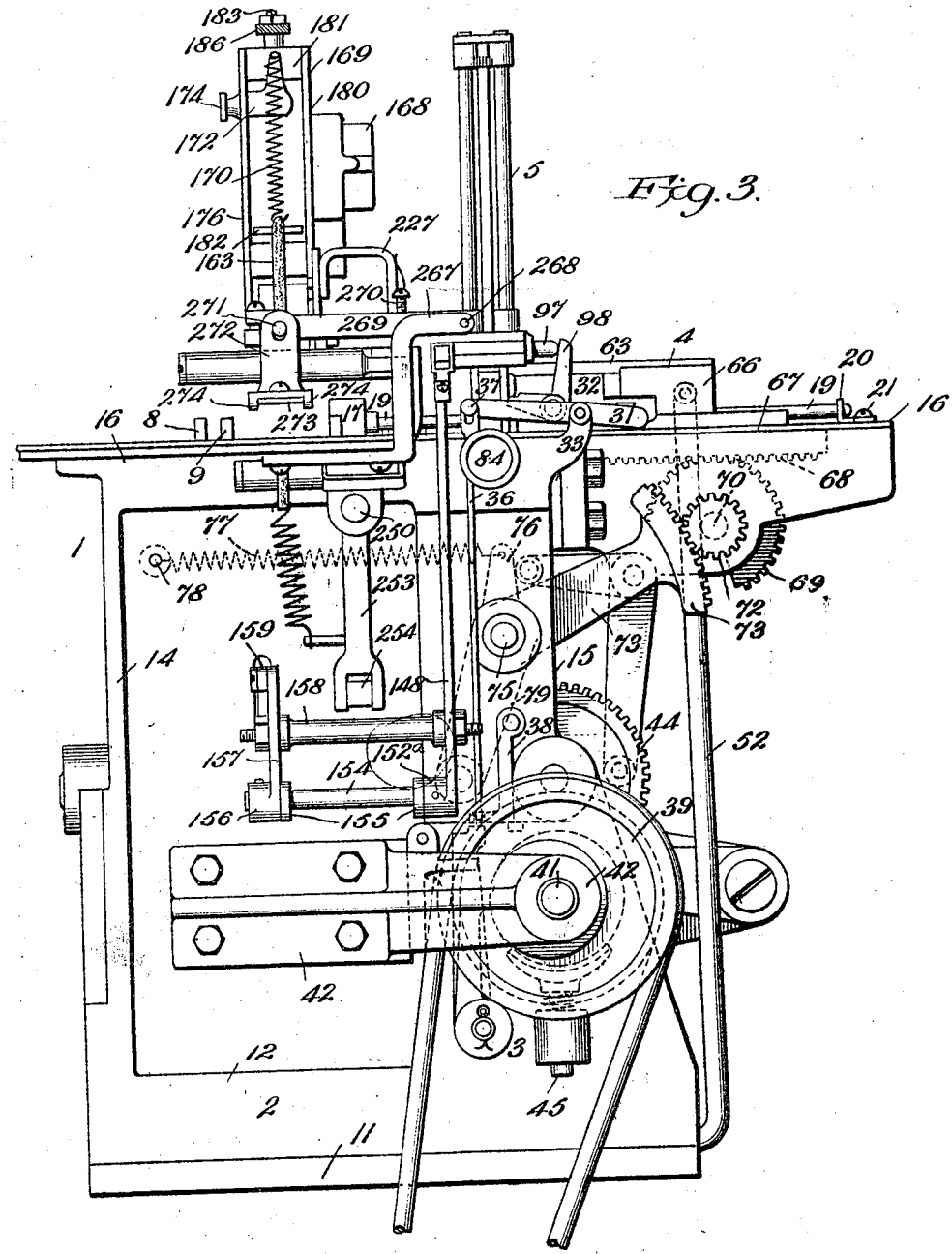
Fig. 3 is a side elevation of the same, the view being taken at the right of Fig. 1, and at the left of Fig. 2.

The ejecting mechanism 9 is required to eject a banded cigar from the apparatus so as to make ready for the next cigar or other article to be banded. It is essential that the banding should take place in such a way that the cigars or other articles will not only be ejected, but also kept right side up so that they may be replaced in the box exactly as they came out, and without twisting or turning, as above set forth. The mechanism by which this is effected is closely connected with the banding mechanism, and will now be set forth more in detail. When the ejecting movement begins the starting head 17 is well to the rear because it is so shifted by the hook 25 on the part 24 which engages the block 66 of the conveyer 4 so as to be clear of the article which has just been banded, and the guide 8 is also depressed by the mechanism above described. The article which has been banded is held by friction between the pad 193 and the fingers 195 and these are shifted to the right by the reciprocation of the rod 250 which has been disclosed above. When this reciprocation has gone the limit of its movement the slide 236 is lowered and thereby causes the lowering of the finger 240 and then this lowering of the arm 194 through the connection above mentioned, raises the fingers 195, then when the rod 250 is shifted to the left, by the mechanism above described, and when the fingers 195 and the projection 240 have passed under the article and are clear of the same and to the left of it, so that the next reciprocation of these parts will positively shift the article to the right, so that one cigar or other article will be forced after another, as above indicated. To keep the cigars from turning, the bracket 267ª extends from the under surface of the table 16, and clear of this table, and then upwardly, and rearwardly and then as shown in Fig. 3 to the pivot 268, and from there runs forwardly to the link 269 which has a set screw 270, by means of which it may be regulated. Fixed in the end of the link 269, by any suitable means, is the horizontally disposed bar or rod 271, and hanging from this bar, on a loose pivot, so as to hang free and true, are the ends 272, which are secured at their lower ends to horizontally disposed plates 273. On the upper surface of the plate 273 are placed the loosely mounted fingers 274, which press lightly upon the cigars or other articles beneath the same and prevent them from turning.

If desired, a stop 275 may be placed at the right of the table 16 so as to limit the number of cigars and their movement to the right so that all may be readily gathered together preparatory to placing them in a box.

Operation.

In view of the foregoing, the operation of my improved device will be readily understood. Assuming that a cigar 18, or other article to be banded, is put in place and shoved true against the head 17 and thereby shifts the rod 19 to the rear, as above stated, to start the apparatus, the action is as follows:

The banding and ejecting mechanisms act, but as no band has been put on the platen 178, the article is ejected without being banded. Meanwhile the conveyer 4 retreats, gets a band, and as soon as it is in place, the band will be shifted to the moistener and moistened, as above described, and then brought forward and delivered to the banding mechanism which will after the next stop, apply it to a cigar, or other article, as above set forth. After delivering the band to the platen 178, the conveyer retreats so as to be clear of the banding mechanism and the machine stops. Then another cigar may be inserted, as above described, and banded while the conveyer gets and moistens another band, and these operations may be continued indefinitely. If care is taken to keep the cigars as they came from the box out of which they were taken to be banded, they will always remain with the same surface uppermost so that they may be reinserted into the same box, in the same order in which they came out, whereby they will fit without being damaged.

While I have shown and described one embodiment of my invention, it is obvious that it is not restricted thereto, but is broad enough to cover all structures that come within the scope of the annexed claims.

Having thus described my invention, what I claim is:—

1. In a machine of the class described, moistening mechanism comprising a tank with a cam mounted therein, a bracket connected to said tank, a pad and means for moving said pad upward through the tank on said cam to contact with a cigar band placed between the pad and said bracket.

2. In a machine of the class described, a moistening device comprising a tank, a cam therein, a pad in said tank, means for carrying said pad and shifting the same according to the outline of said cam, a bracket adapted to coöperate with said pad to moisten a band, and means for partially drying said pad as it approaches said bracket and after it has left the water in the bottom of the tank.

3. In a machine of the class described, a support for a cigar, a platen for holding a band and also holding the cigar on said support, a pair of band wrapping fingers, a pair of tapes secured to the platen and extending over the fingers and mechanism for pivoting said fingers so that the same, in conjunction with said tapes, apply a band about a cigar.

4. In a machine of the class described, a head with a platen mounted therein, a tape secured to said platen, springs connected to said tape, and mechanism connecting said head and springs whereby the springs may simultaneously have their tension changed so as to put any desired tension on each end of said tape.

5. In a machine of the class described, the combination of the band container, of a reciprocating conveyer, suction means for withdrawing bands individually from said container, means on said conveyer for receiving the band from the suction means and holding the same on the conveyer, moistening means and band applying mechanism, conveyer adapted to transfer the band to the moistening means and thence to the band applying means.

6. In a machine of the class described, the combination with a band conveyer, of means to impart motion thereto, moistening means to which a band carried by said conveyer is brought, band applying means adapted to receive the moistened band from said conveyer and suction means in conjunction with said band applying means to remove the band from said conveyer and hold the same while it is being applied to the cigar.

7. In a machine of the class described, band applying mechanism comprising a vertically movable suction tube for receiving and holding a cigar band, a tape secured adjacent to said suction tube and extending from the sides thereof, tension means on the ends of said tape and fingers for acting on said tape to cause it to wrap the band held by the suction tube about a cigar.

8. In a machine of the class described, band applying mechanism comprising a frame, a vertically movable suction tube, a head on one end of said suction tube, a tape secured to and extending from said head and a pair of fingers pivotally mounted in the frame for acting on the tape to cause it to wrap a band held by the suction tube about a cigar.

9. In a machine of the class described, band applying mechanism comprising a frame, a vertically movable suction tube in said frame, a head on one end of said tube, a tape secured to and extending laterally from said head, springs secured on the ends of said tape and extending therefrom to the frame, a pair of fingers pivotally mounted in the frame and mechanism for actuating said fingers to cause them to wrap a band held on the head of the suction tube about a cigar.

10. In a machine of the class described, band applying mechanism, mechanism for removing a banded cigar comprising a reciprocating shaft, an arm pivoted thereon, a finger pivoted on said shaft, mechanism for causing said arm and finger to move toward one another to hold a banded cigar between them, mechanism for moving the reciprocating shaft away from the banding mechanism to bring the banded cigar held between the finger and arm away with it.

11. In a machine of the class described, cigar removing mechanism comprising a reciprocating shaft, a bracket secured on the same, an arm pivoted on said bracket, a pad on the free end of said arm, a vertically movable slide for supporting the end of said arm and moving the same upwardly, a finger pivoted on the bracket and mechanism for causing the finger and arm to move toward one another to hold a cigar between them.

12. In a machine of the class described, a band container and a band conveyer, means for removing a band from said container, means on the conveyer for receiving a band from the band removing means, moistening means and means adjacent said moistening means adapted to rest on top of the band on the conveyer to hold the same while it is being moistened.

13. In a machine of the class described, band applying mechanism, comprising a frame, a pair of fingers pivoted on said frame, tapes extending over said fingers, an air suction tube extending through said frame and movable therein for receiving and holding a moistened cigar band between the fingers, and means for actuating one of the fingers in coöperation with its tape to wrap one end of the band about a cigar and means for causing the other finger, in coöperation with its tape, to wrap the other end of the band about the cigar and over the first mentioned end of the band.

14. In a machine of the class described, a band applying mechanism, comprising a reciprocating frame, a pair of fingers pivoted on said frame, tapes extending over said fingers, an air suction tube extending through said frame, means for reciprocating the tube therein, means for causing suction in said tube to cause a band to be held on the end of said tube and between the fingers, and means for actuating the fingers to cause them, in coöperation with the tapes, to apply the band held by the suction tube about a cigar.

15. In a machine of the class described, band applying mechanism, comprising a support for a cigar, a frame, an air suction tube for receiving a band and holding it against the cigar on its support, a band wrapping finger on one side of the suction tube and a band wrapping finger on the opposite side, a tape extending over said fingers, means for holding said tapes under tension and means for actuating the fingers to cause them, in coöperation with the tapes, to apply the band about a cigar.

16. In a machine of the class described, a support for a cigar, a movably mounted frame, an air suction tube adapted to reciprocate in said frame and hold a band against said cigar, a pair of fingers and tapes extending over the same, one of said fingers and tapes disposed on one side of the suction tube and another finger and tape on the opposite side of said tube, mechanism for actuating one of the fingers to cause one of the tapes to fold one end of the band about a cigar and hold said end against the cigar, mechanism for actuating the other finger to cause the other tape to wrap the other end of the band about the cigar and over the first mentioned end and mechanism for applying pressure to the last mentioned end of the band after it has been folded about the cigar.

17. In a machine of the class described, a frame, a vertically movable band holding suction tube mounted in said frame, a pivoted finger mounted in the frame on one side of said tube, a pivoted finger on the frame opposite the first mentioned finger, a tape extending over each of said fingers, tension means on said tapes and means for actuating the fingers to cause the tapes to wrap the ends of the band about a cigar.

Signed at the city, county and State of New York, this 9th day of May, 1916.

FRANCIS X. MALOCSAY.